April 12, 1932.  V. BENDIX  1,853,295
MAGNETIC SERVO BRAKE
Filed Sept. 13, 1928  2 Sheets-Sheet 1

INVENTOR.
VINCENT BENDIX
ATTORNEY.

April 12, 1932.                V. BENDIX                    1,853,295
                            MAGNETIC SERVO BRAKE
                         Filed Sept. 13, 1928       2 Sheets-Sheet 2

INVENTOR
                                          VINCENT BENDIX
                                 BY
                                                    ATTORNEY

Patented Apr. 12, 1932

1,853,295

UNITED STATES PATENT OFFICE

VINCENT BENDIX, OF CHICAGO, ILLINOIS, ASSIGNOR TO BENDIX BRAKE COMPANY, OF SOUTH BEND, INDIANA, A CORPORATION OF ILLINOIS

MAGNETIC SERVO BRAKE

Application filed September 13, 1928. Serial No. 305,829.

This invention relates particularly to brakes of the servo type wherein one of a number of brake shoes is applied to the moving brake drum and by frictional contact therewith is moved slightly from its normal position in the direction of rotation of the moving drum, this movement being employed to apply other shoes.

An object of my invention is to provide means associated with the brake drum whereby electro-magnetic energy applies a servo shoe, and suitable mechanism to employ the action of this shoe due to its contact with the drum to apply other shoes.

Figure 1:
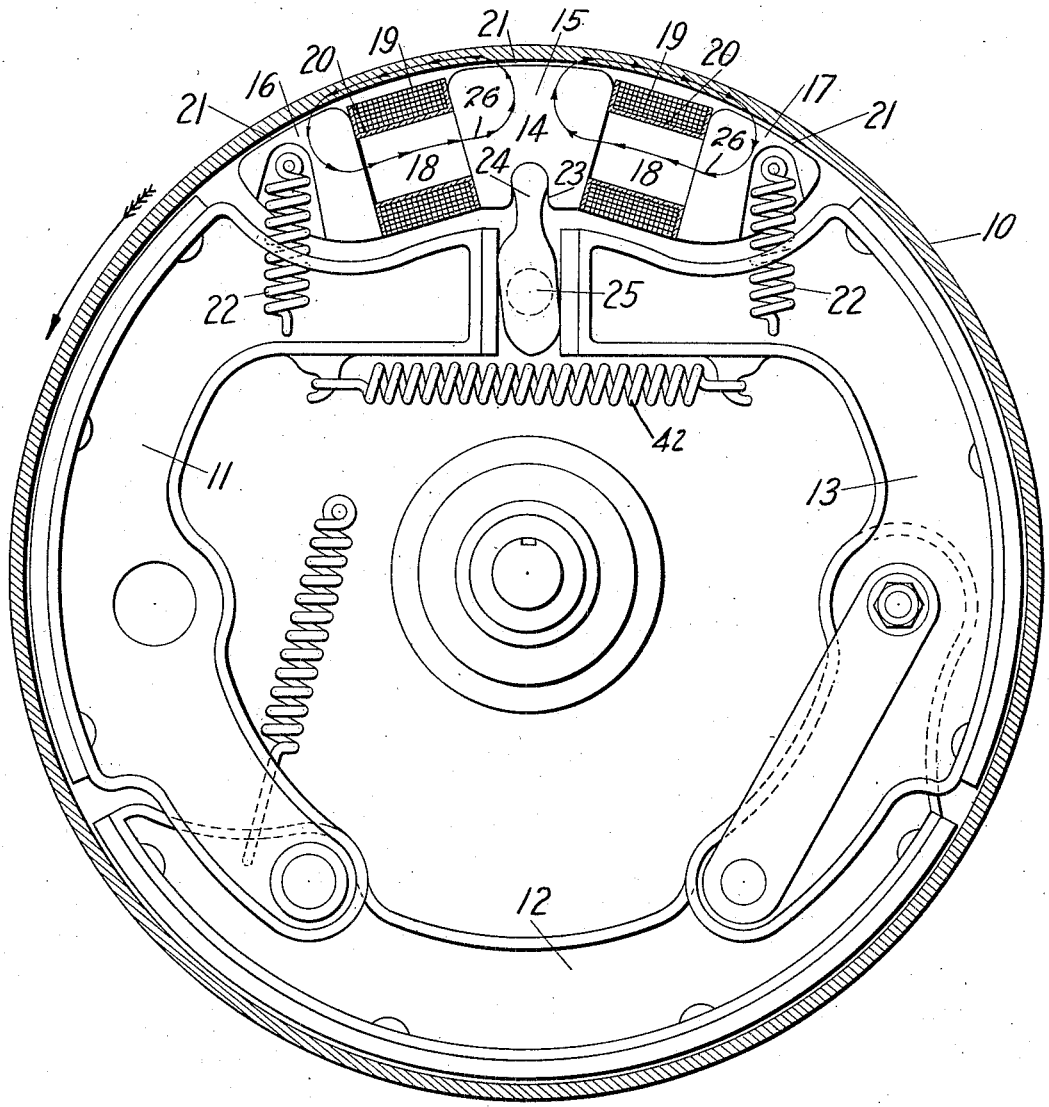
Figure 2:
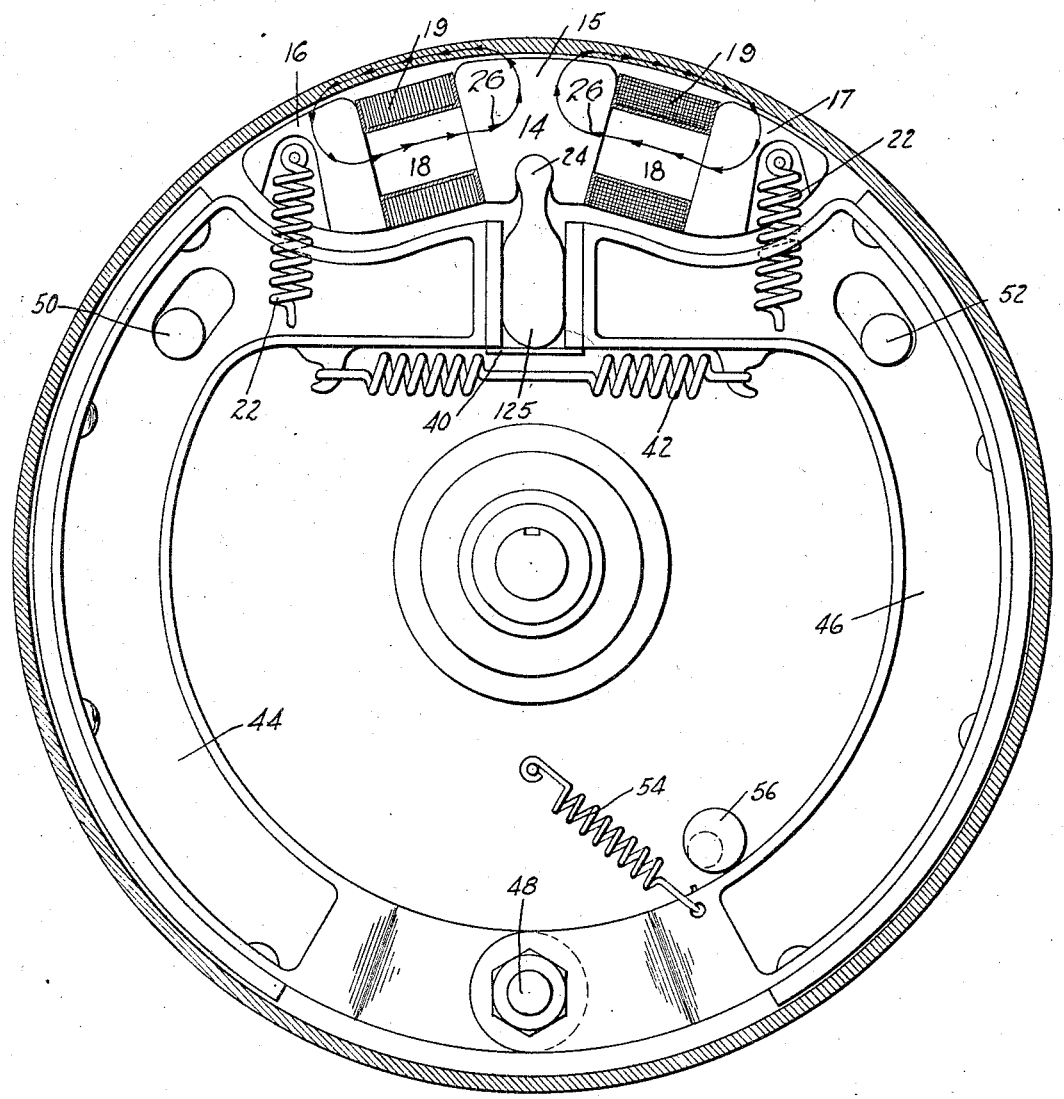

I attain this and other objects by the structure shown in the accompanying drawings, in which:

Figures 1 and 2 are vertical sections through two different modifications just inside the heads of the brake drums, and showing the brake shoes in side elevation.

For purposes of illustration only, in Figure 1 I show my magnetic servo shoe applied to a brake having the first of three other shoes arranged to give a mechanical servo action to its adjoining shoe, but it may be employed to advantage by combining it with a less or greater number of mechanical operable shoes none of which have any servo action.

In the drawings the numeral 10 represents the drum, 11 the primary shoe, 12 the secondary shoe and 13 the auxiliary shoe of a 'Bendix' servo brake. These shoes differ from the standard only in that shoes 11 and 13 are somewhat shorter to provide space for the magnetic shoe 14.

Shoe 14 comprises relatively heavy sections 15, 16 and 17 of magnetizable material joined by reduced sections 18 carrying coils 19 wound on spools 20 of insulation. Surfaces 21 are adapted to make contact with the brake drum 10, and springs 22 secured to shoe 14 at one end and to shoes 11 and 13 at their other ends normally hold surfaces 21 out of contact.

By means of a groove 23 in the bottom, section 15 straddles the end of an arm 24 extending upwardly from cam 25. Cam 25 without the arm 24 is substantially as used in standard brakes.

With a suitable current source connected to coils 19, and a suitable current controller in the circuit, the brake shown may be operated by electrical energy alone and when so arranged and operated will be particularly applicable to automotive trailers or similar uses where mechanical connection to the brakes is difficult to attain, but as will be obvious from the description and drawings, my invention may be readily adapted to a system of combined power and manual braking, similar to those being commercially marketed as "booster" brakes.

To employ my invention in a booster braking system, cam 25 is given partial rotation by a manual means, not shown, whereupon shoes 11, 12 and 13 are expanded against drum 10 as in ordinary practice. But, simultaneously with the application of the manual effort, a suitable controller, not shown, apportions electrical energy in proper amount to the coils 19 and thereby creates magnetic lines as indicated by arrows 26 which complete their circuit through a portion of brake drum 10 as shown.

Shoe 14 is consequently attracted to the inner diameter of drum 10, whereupon the drum will carry the shoe along in its direction of rotation, and groove 23 will act against the end of arm 24 to assist the manual means, not shown, to rotate the cam to further apply the mechanically operable shoes.

In Figure 2, the magnetic servo shoe 14 operates a floating cam 125 resting on a ledge 40, which may be secured to the brake backing plate or to the end of either one of the shoes. The cam operates, against the resistance of a return spring 42, to expand a floating friction device, preferably consisting of shoes 44 and 46 connected by a floating pivot 48. The shoes are slotted to embrace fixed anchors 50 and 52. If the drum is turning clockwise when the brake is applied, shoe 44 anchors against pivot 50, whereas if the drum is turning counterclockwise the shoe 46 anchors against pivot 52.

The lower ends of shoes 44 and 46 are positioned clear of the drum when the brake is released, by an auxiliary return spring 54 holding shoe 46 against an adjustable eccentric stop 56.

From the foregoing description and drawings it will be apparent that the magnetic shoe 14 has a more or less compound effect, in that it retards drum 10 by its own contact therewith and at the same time rotates cam 25 or 125 to cause the other shoes to act, and while but two embodiments of these principles are shown, it is obvious that many modifications may be made in the structure without departing from the spirit of the invention.

I claim:

1. A magnetic servo brake comprising, a rotatable brake drum, cam operated brake shoes, a cam to operate said shoes, an outwardly extending arm on said cam, a magnetically operable floating brake shoe having a groove at its inner side which straddles the end of said upwardly extending arm whereby application of said magnetically operable shoe to said drum retards said drum and the resulting slight movement of said magnetically operable shoe in the direction of rotation of said drum moves said arm to operate said cam to apply said cam operable shoes.

2. A brake comprising, in combination, a drum, floating shoes within the drum having an operating cam, and a floating magnetic shoe between the cam and drum opposite the shoe ends and arranged to operate the cam.

3. A brake comprising a pair of floating shoes having adjacent ends, and a floating magnetic servo shoe overlapping said ends and arranged to force them apart to apply the brake.

4. A brake comprising a pair of floating shoes having adjacent ends, a servo shoe overlapping said ends and arranged to force them apart to apply the brake, and return springs tensioned between the servo shoe and said ends.

5. In combination with a rotatable drum, friction means supported within said drum having spaced apart adjacent ends, a floating servo friction shoe supported between the adjacent ends of said friction means and adapted to be magnetically coupled with said drum, and resilient means connecting corresponding ends of said servo shoe and friction means adapted to center the assembly.

6. In combination with expansible friction means having spaced apart adjacent ends and a floating magnetic servo shoe supported between said ends and adapted to actuate the same, means connecting corresponding ends of said shoe and said friction means, and means connecting adjacent ends of said friction means whereby said shoe and friction means are maintained properly centered at all times.

7. Brake mechanism including, in combination, a rotatable drum, expansible floating friction means having separable ends supported within the drum, floating magnetic means adapted when energized to be frictionally urged by said drum, and floating applying means mechanically connecting separable portions of the expansible friction means with said magnetic means for actuation thereby.

8. Brake mechanism including, in combination, a rotatable drum, expansible floating friction means having separable ends supported within said drum and having one part adapted to anchor when the drum is rotating in one direction and another part adapted to anchor when the drum is rotating in the opposite direction, floating magnetic friction means overlapping the separable ends of the friction means and adapted when energized to be frictionally coupled with the drum to be urged to rotate therewith in either direction, and having a floating mechanical couple with the separable ends of the friction means whereby one of said ends is urged continuously and positively away from the other of said ends after the latter has anchored during the application of the brake.

9. In combination with a rotatable brake drum, expansible floating friction means having separable spaced apart ends supported within the drum to anchor at one end when the drum is rotating in one direction and at the other end when the drum is rotating in the other direction, means adjacent the separable ends of said friction means for anchoring the same in either direction of rotation, and floating arcuate magnetic friction means overlapping the adjacent ends of said friction means and adapted to be frictionally urged by the drum when energized to be urged rotatively therewith in either direction of rotation and having a direct mechanical couple with the separable ends of the friction means to urge the same against the drum.

10. In combination with a rotatable brake drum, floating friction means having separable ends supported within the drum to anchor at one end when the drum is rotating in one direction and at the other end when the drum is rotating in the other direction, means adjacent the separable ends of said friction means for anchoring the same in either direction of drum rotation, floating magnetic friction means overlapping said adjacent ends and adapted to be frictionally urged by said drum when energized to be urged rotatively therewith in either direction of rotation and mechanically coupled with the separable ends of the friction means to spread the same apart against the drum and adapted upon the anchoring of either one end to float with the other end and with the magnetic means.

11. In combination with a rotatable brake drum, floating friction means supported for limited rotary movement within said drum and having adjacent separable ends, means for anchoring said friction means adjacent each separable end, magnetic friction means overlapping said separable ends adapted when energized to be frictionally urged by the drum and coupled with said friction means to exert a continuous positive pressure upon either end thereof upon the anchoring of the other end during the application of the brake.

12. Brake mechanism, comprising, in combination, a rotatable drum, floating expansible friction means having separable ends arranged therein to anchor adjacent one end when the drum is rotating in one direction and adjacent the other end when the drum is rotating in the other direction, floating magnetic means overlapping said ends adapted to be energized to pick up the rotating of the drum in either direction and connected by a floating mechanical couple with each separable end of the friction means to urge either end against the drum and away from the anchored end.

13. Brake mechanism comprising, in combination, a rotatable drum, expansible floating brake friction means having separable ends and arranged within the drum to be urged thereagainst and adapted to anchor at one end when the drum is rotated in one direction and at the other end when the drum is rotated in the opposite direction, floating magnetic friction means overlapping the separable ends of the brake friction means and adapted to be energized to be frictionally coupled with the drum to be rotatably urged thereby and provided with a part adapted to float therewith and coupled with the brake friction means to urge either end thereof away from its anchor to expand said brake friction means against the drum, and a spring connecting the separable ends of the brake friction means to urge the same to its normal inoperative position and acting through said brake friction means and through said part coupling the magnetic means therewith to return said floating magnetic means to its normal inoperative position.

14. Brake mechanism comprising, in combination, a rotatable drum, expansible floating brake friction means having separable ends and arranged within the drum to be urged thereagainst and adapted to anchor at one end when the drum is rotated in one direction and at the other end when the drum is rotated in the opposite direction, floating magnetic friction means overlapping the separable ends of the brake friction means and adapted to be energized to be frictionally coupled with the drum to be rotatably urged thereby and provided with a part adapted to float therewith and coupled with the brake friction means to urge either end thereof away from its anchor to expand said brake friction means against the drum, yielding return means acting on said brake friction means to hold the same normally in its inoperative position and acting on said floating magnetic friction means to hold it normally in its inoperative position.

15. Brake mechanism comprising, in combination, a rotatable drum, expansible floating brake friction means having separable ends and arranged within the drum to be urged thereagainst and adapted to anchor at one end when the drum is rotated in one direction and at the other end when the drum is rotated in the opposite direction, floating magnetic friction means overlapping the separable ends of the brake friction means and adapted to be energized to be frictionally coupled with the drum to be rotatably urged thereby and provided with a part adapted to float therewith and coupled with the brake friction means to urge either end thereof away from its anchor to expand said brake friction means against the drum, spring means acting on said brake friction means to hold it normally in the inoperative position and acting therethrough and through the part which couples the magnetic friction means therewith to normally return the magnetic friction means to its inoperative position, and spring means acting directly on said magnetic friction means to break its frictional engagement with the drum.

16. Brake mechanism comprising, in combination, a rotatable drum, expansible floating brake friction means having separable ends and arranged within the drum to be urged thereagainst and adapted to anchor at one end when the drum is rotated in one direction and at the other end when the drum is rotated in the opposite direction, floating magnetic friction means overlapping the separable ends of the brake friction means and adapted to be energized to be frictionally coupled with the drum to be rotatably urged thereby and provided with a part adapted to float therewith and coupled with the brake friction means to urge either end thereof away from its anchor to expand said brake friction means against the drum, spring means acting directly upon said magnetic friction means to hold the same normally out of frictional engagement with the drum, and spring means acting on said brake friction means to hold its separable ends normally anchored and acting through said brake friction means to center said magnetic friction means in its inoperative position with respect to the brake friction means.

17. Brake mechanism comprising, in combination, a rotatable drum, expansible floating brake friction means having separable ends and arranged within the drum to be urged thereagainst and adapted to anchor at one end when the drum is rotated in one direction and at the other end when the drum is rotated in the opposite direction, floating magnetic friction means overlapping the separable ends of the brake friction means and coupled therewith by a floating applying device adapted to spread said ends apart when actuated by the magnetic friction means, said floating applying device supported at one end by said magnetic friction means and at the opposite end by a stationary support.

18. Brake mechanism comprising, in combination, a rotatable drum, expansible floating brake friction means having separable ends and arranged within the drum to be urged thereagainst and adapted to anchor at one end when the drum is rotated in one direction and at the other end when the drum is rotated in the opposite direction, floating magnetic friction means arranged adjacent the separable ends of the brake friction means and adapted to be energized to be frictionally coupled with the drum to be rotatably urged thereby, a fixed support adjacent the separable ends of the brake friction means, a floating applying device positioned between the separable ends of the brake friction means and supported at one end upon said support and at the opposite end upon said floating magnetic friction means whereby the floating applying device is actuated by the magnetic friction means to spread the separable ends of the brake friction means apart.

In testimony whereof, I have hereunto signed my name.

VINCENT BENDIX.